(12) United States Patent
Chen et al.

(10) Patent No.: US 11,163,628 B2
(45) Date of Patent: Nov. 2, 2021

(54) METHOD, DEVICE AND COMPUTER PROGRAM PRODUCT FOR ERROR MANAGEMENT BASED ON A UTILIZATION RATE OF AN ACCELERATOR DEVICE

(71) Applicant: EMC IP Holding Company LLC, Hopkinton, MA (US)

(72) Inventors: Tao Chen, Beijing (CN); Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 16/863,628

(22) Filed: Apr. 30, 2020

(65) Prior Publication Data

US 2021/0182132 A1    Jun. 17, 2021

(30) Foreign Application Priority Data

Dec. 12, 2019   (CN) .......................... 201911274819.6

(51) Int. Cl.
*G06F 11/07*   (2006.01)
*G06F 11/20*   (2006.01)
*G06N 20/00*   (2019.01)

(52) U.S. Cl.
CPC ........ *G06F 11/076* (2013.01); *G06F 11/0736* (2013.01); *G06F 11/0745* (2013.01); *G06F 11/0757* (2013.01); *G06F 11/0793* (2013.01); *G06F 11/203* (2013.01); *G06N 20/00* (2019.01)

(58) Field of Classification Search
CPC ............. G06F 11/0736; G06F 11/0757; G06F 11/0754; G06F 11/076; G06F 11/0793; G06F 11/202; G06F 11/2023; G06F 11/2028; G06F 11/203; G06F 11/3031; H04L 43/10; H04L 43/103; H04L 67/14; H04L 67/143; H04L 67/145
See application file for complete search history.

(56) References Cited

U.S. PATENT DOCUMENTS

| | | | | |
|---|---|---|---|---|
| 6,370,656 | B1* | 4/2002 | Olarig | G06F 11/0721 709/201 |
| 6,526,433 | B1* | 2/2003 | Chang | G06F 11/0709 709/201 |
| 6,640,268 | B1* | 10/2003 | Kumar | G06F 13/22 710/15 |
| 2004/0098449 | A1* | 5/2004 | Bar-Lavi | H04L 67/42 709/202 |

(Continued)

OTHER PUBLICATIONS

Will, B. et al, "Intel® QuickAssist Technology & OpenSSL-1.1.0: Performance" Network Security Content Delivery Networks, Web Servers, Load Balancing, Intel, 2017 (12 pages).

*Primary Examiner* — Gabriel Chu
(74) *Attorney, Agent, or Firm* — Chamberlain, Hrdlicka, White, Williams & Aughtry (57) ABSTRACT

Embodiments of the present disclosure relate to a method, device and computer program product for error management. The method comprises obtaining a utilization rate of an accelerator device in accelerator resources, and the accelerator resources comprise one or more accelerator devices. The method further comprises adjusting a detection parameter for detecting an error in the accelerator device based on the utilization rate of the accelerator device, and performing error detection for the accelerator device based on the detection parameter.

14 Claims, 3 Drawing Sheets

(56) References Cited

U.S. PATENT DOCUMENTS

| | | | | |
|---|---|---|---|---|
| 2004/0236880 A1* | 11/2004 | Barrett | ............... | G06F 11/0787 |
| | | | | 710/52 |
| 2007/0226333 A1* | 9/2007 | Morich | ................ | H04L 69/40 |
| | | | | 709/224 |
| 2009/0059950 A1* | 3/2009 | Gao | .................... | H04L 67/325 |
| | | | | 370/449 |
| 2012/0117572 A1* | 5/2012 | Baratakke | .............. | H04L 43/10 |
| | | | | 719/313 |
| 2012/0185585 A1* | 7/2012 | Bhate | ............... | H04L 63/1458 |
| | | | | 709/224 |
| 2015/0222519 A1* | 8/2015 | Chu | ................... | H04L 43/024 |
| | | | | 709/224 |
| 2016/0306722 A1* | 10/2016 | Zou | .................... | G06F 11/3409 |
| 2017/0060492 A1* | 3/2017 | Boldt | .................... | H04L 43/10 |
| 2019/0245735 A1* | 8/2019 | Umezawa | ............... | H04L 69/40 |
| 2020/0042415 A1* | 2/2020 | Maddukuri | ........ | G06F 11/0757 |

\* cited by examiner

METHOD, DEVICE AND COMPUTER PROGRAM PRODUCT FOR ERROR MANAGEMENT BASED ON A UTILIZATION RATE OF AN ACCELERATOR DEVICE

CROSS-REFERENCE TO RELATED APPLICATIONS

This application claims priority to Chinese Application No. 201911274819.6 filed on Dec. 12, 2019. Chinese Application No. 201911274819.6 is hereby incorporated by reference in its entirety.

FIELD

Embodiments of the present disclosure generally relate to the field of computer technology, and more specifically, to a method, device and computer program product for error management.

BACKGROUND

Accelerator resources refer to some processing resources having acceleration features, such as a coprocessor capable of assisting a Central Processing Unit (CPU) in performing some acceleration tasks. The coprocessor, as a chip, can mitigate the specific processing tasks on the system CPU. For example, a math coprocessor may handle digital processing, while a Graphical Coprocessor (GPU) may process video rendering. GPU is a core processor dedicated to graphics or images, and it is mainly responsible for accelerating the speed of graphical processing.

Quick Assist Technology (QAT) card is also a coprocessor, which may be provided for accelerating compute-intensive tasks, such as compression, encryption and so on. By adding the QAT card into the system, the running of the applications may be accelerated and system performance and efficiency can be boosted. The functions provided by the QAT card may include symmetrical encryption, identity authentication, asymmetrical encryption, digital signature, public key encryption and lossless data compression and so on.

SUMMARY

Embodiments of the present disclosure provide a method, device and computer program product for error management.

In accordance with an aspect of the present disclosure, there is provided a method for error management. The method comprises obtaining a utilization rate of an accelerator device in accelerator resources, and the accelerator resources comprise one or more accelerator devices. The method further comprises adjusting a detection parameter for detecting an error in the accelerator device based on the utilization rate of the accelerator device, and performing an error detection for the accelerator device based on the detection parameter.

In accordance with another aspect of the present disclosure, there is provided an electronic device. The device comprises a processing unit and a memory coupled to the processing unit and stored with instructions. The instructions, when executed by the processing unit, perform acts of obtaining a utilization rate of an accelerator device in accelerator resources, and the accelerator resources comprise one or more accelerator devices. The acts further comprise adjusting a detection parameter for detecting an error in the accelerator device based on the utilization rate of the accelerator device, and performing an error detection for the accelerator device based on the detection parameter.

In accordance with a further aspect of the present disclosure, there is provided a computer program product tangibly stored on a non-transitory computer readable medium and comprising computer-executable instructions. The computer-executable instructions, when executed, cause a computer to perform the method or the procedure in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of various embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign refers to the same component in the example embodiments of the present disclosure.

DETAILED DESCRIPTION OF EMBODIMENTS

Preferred embodiments of the present disclosure will be described in more detail below with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "comprise" and its variants are to be read as open-ended terms that mean "comprise, but not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless indicated otherwise.

In general, an error or failure may occur in a hardware device during its usage, so it is required to detect an error of an accelerator device during its operation. Errors of the accelerator device usually may include recoverable errors and fatal errors, wherein the recoverable errors may be reported in the form of codes via an Application Program Interface (API), while the fatal errors may be detected using heartbeat API. The API may be preconfigured with some detection parameters, such as timeout value and detection frequency. If a response time of the accelerator device exceeds the timeout value, the API will report a fatal error. However, when the workloads on the accelerator device are heavy, the response of the accelerator device may become slow, causing a delay in response. In such cases, a fatal error alarm may be induced although the accelerator device per se is fault-free. Misreporting may result in unnecessary and expensive error recovery operations, which causes a bad user experience and negatively impacts system performance. In addition, if the detection frequency is low, the error may be detected with delays. However, a high detection frequency causes excessively frequent detections and further affects the system performance.

Generally, a traditional error detection method configures one or more fixed detection parameters (such as fixed timeout value), and it is expected to receive an echo response within a predetermined time window (e.g., fixed timeout value). However, the fixed timeout value cannot adapt to workloads under various situations. Specifically, if the timeout value is set to a small number, the possibility of misreporting at the time of heavy workloads will increase. For another, if the timeout value is set to a large number, there may be a delay in reporting the true error, which further impairs availability and performance of the application.

As such, embodiments of the present disclosure propose a new solution of error detection of the accelerator device. A workload-aware detection parameter adjustment solution is proposed according to embodiments of the present disclosure, and it can adaptively adjust detection parameters (e.g., timeout value, frequency and the like) according to the current usage of the accelerator device (such as current running workload), thereby detecting the error more effectively and accurately.

Moreover, some embodiments of the present disclosure further propose an improved error recovery solution and an improved failover solution so as to determine an error recovery object and select a failover target. Therefore, the error management solution according to some embodiments of the present disclosure (including certain combinations of error detection solution, error recovery solution and failover solution according to embodiments of the present disclosure) makes improvements in one or more of the following aspects. First, the error management solution according to embodiments of the present disclosure can detect the error more effectively, and improve accuracy of the error detection by use of the adaptive timeout setting. A suitable detection frequency will minimize the influence on the system performance. Second, the error management solution according to embodiments of the present disclosure is more intelligent, and it formulates an error recovery strategy and a failover strategy using topology information and historical error information of the accelerator resources, which omits unnecessary error recovery operations and further avoids migrating the workload to unstable accelerator devices or instances. Third, the error management solution according to embodiments of the present disclosure has better performance and availability, and it minimizes the error influence by migrating the workload to be processed to a suitable (e.g., most stable and idlest) instance of the accelerator device, thereby ensuring application availability.

Basic principles and several example implementations of the present disclosure are explained below with reference to FIGS. 1-6. It should be understood that the example embodiments are provided merely for enabling those skilled the art to better understand and further implement the embodiments of the present disclosure, rather than limiting the scope of the present disclosure in any manner.

Figure 1:
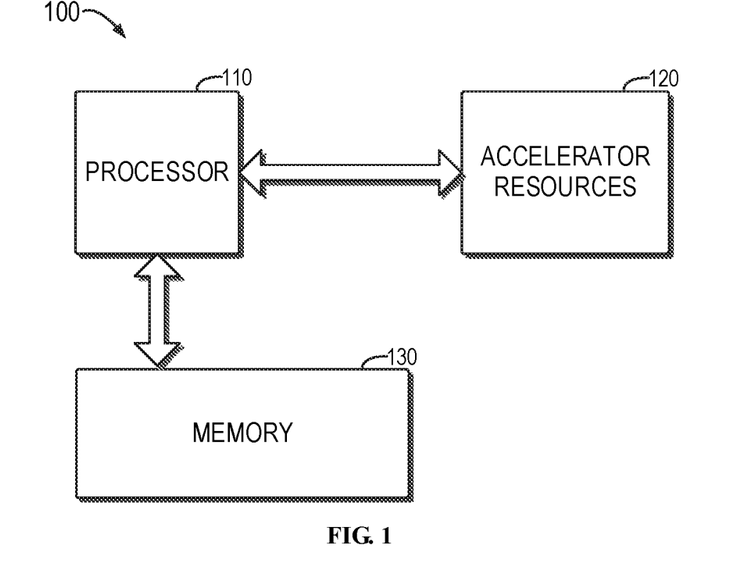
FIG. 1 illustrates a schematic diagram of an architecture of a part of an example computing system according to embodiments of the present disclosure.

FIG. 1 illustrates a schematic diagram of an architecture of a part of an example computing system 100 according to embodiments of the present disclosure. As shown in FIG. 1, the computing system 100 includes a processor 110, accelerator resources 120 and a memory 130. It should be understood that the computing system 100 also may include one or more other components not shown.

The accelerator resources 120 may include one or more accelerator devices acting as a coprocessor to the computing system 100 to mitigate some processing tasks on the processor 110 such as a CPU. The accelerator resources 120 can implement certain accelerating operations of specific features and computations to achieve a higher execution efficiency than the processor 110. In some embodiments, the accelerator resources 120 may be one or more QAT accelerator cards to accelerate encryption and/or decryption for the data, or compression and/or decompression for the data. It should be understood that although the QAT card acts as the example of the accelerator resources in some embodiments of the present disclosure, the accelerator resources also may be a hardware processing device with acceleration features for specific tasks (such as encryption/decryption, compression, matrix operation and so on).

Because an error or failure may occur in the hardware device during its usage, it is required to constantly detect whether hardware and/or software error occurs in the accelerator resources 120. For example, the QAT card provides some APIs for calling and querying whether the accelerator device operates normally. Embodiments of the present disclosure provide an improved error detection solution, which can set suitable detection parameters based on the workload situation in the accelerator. For example, if the workload on the accelerator device is full, the timeout value may be set to a large number. In this way, the situation where the error is wrongly reported due to the accelerator device fails to process the detection request in time can be avoided, and thus the accuracy of error detection can be improved.

Figure 2:
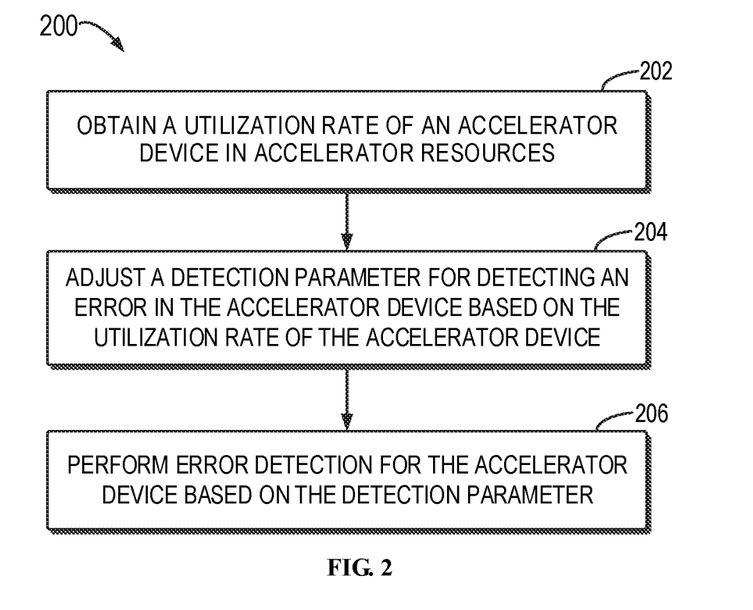
FIG. 2 illustrates a flowchart of a method for error detection according to embodiments of the present disclosure.

FIG. 2 illustrates a flowchart of a method 200 for error detection according to embodiments of the present disclosure. At 202, a utilization rate of an accelerator device in the accelerator resources is obtained, wherein the accelerator resources include one or more accelerator devices. For example, a current utilization rate may be obtained for a certain accelerator device in the QAT card, and any method currently known or to be developed may be used in combination with the embodiments of the present disclosure to obtain the utilization rates of respective accelerator devices.

At 204, the detection parameter for detecting an error in the accelerator device is adjusted based on the utilization rate of the accelerator device. Embodiments of the present disclosure are aware of the current workload on the accelerator device and set suitable detection parameter(s) for the accelerator device. For example, a timeout value and a detection frequency corresponding to the utilization rate may be obtained based on a pre-established mapping table, and the mapping table may be obtained by experimentation or machine learning. In some embodiments, when the utilization rate of the accelerator device increases, the timeout value also increases while the detection frequency decreases, so as to reduce misreports resulting from delayed response and to diminish the influence on the system performance by the error detection.

At 206, the error detection is performed for the accelerator device based on the detection parameter. For example, the detection request may be initiated periodically for the accelerator device based on the adjusted detection frequency, and then a response time of the accelerator device to each detection request may be determined. If it is determined that a certain response time of the accelerator device is greater than the timeout value, an error occurs in the accelerator device. In some embodiments, an error code and/or error log may be returned in the presence of the error, and a source or position of the error may be determined by analyzing the error code and/or error log. For example, the error may be a hardware error, or a software instance error, or a session error of the accelerator device.

Therefore, the workload-aware detection parameter adjustment solution according to embodiments of the present disclosure can adjust the detection parameter such as a timeout value and/or a frequency adaptively according to the current usage of the accelerator device, thereby detecting the errors more effectively and more accurately.

Figure 3:
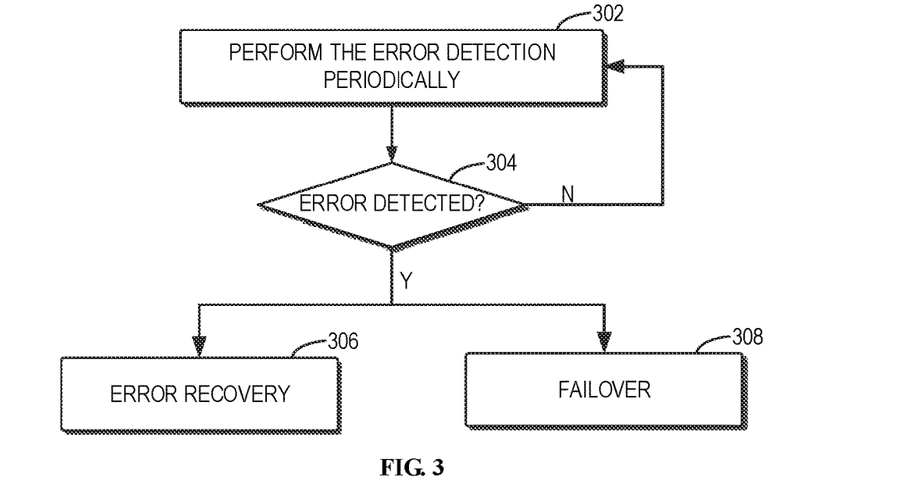
FIG. 3 illustrates a flowchart of a method for error management according to embodiments of the present disclosure.

FIG. 3 illustrates a flowchart of a method 300 for error management according to embodiments of the present disclosure. At 302, the error detection is performed periodically for the accelerator device according to the set detection frequency or adjusted detection frequency. At 304, it is determined whether an error is detected. If not, the method returns to 302 and continues to perform the error detection after a predetermined time period. If the error is detected at 304, it is required to perform the error recovery for a given object level in the accelerator device at 306, and the unfinished workload will be transferred to other software instances at 308.

Figure 4:
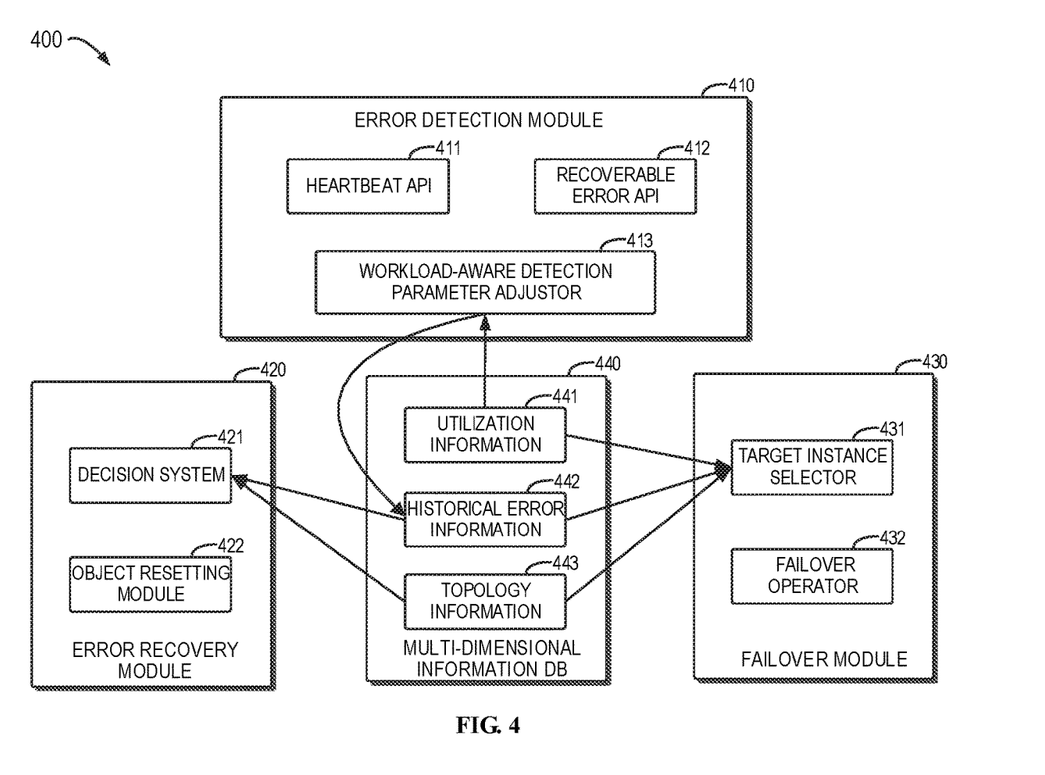
FIG. 4 illustrates a schematic diagram of a framework of an error detection system according to the present disclosure.

FIG. 4 illustrates a schematic diagram of an example framework of an error detection system 400 according to the present disclosure. As shown, the error detection system 400 may include an error detection module 410, an error recovery module 420, a failover module 430 and a multi-dimensional information database (DB) 440. Example implementations of each module are respectively introduced below. It should be understood that the error detection system 400 described in FIG. 4 is just an example implementation of the embodiments of the present disclosure and the error detection system may include more or less modules.

Multi-Dimensional Information Database

As shown in FIG. 4, the multi-dimensional information database 440 may include utilization rate information 441 and historical error information 442 of respective accelerator devices in the accelerator resources and topology information 443 of the accelerator resources. In some embodiments, the utilization rate information 441 of the accelerator device also may include availability of each instance and queue depth of each instance. The historical error information 442 records every error in history dimension. From the view of engineering experience, one device that has experienced errors before is more likely to be error-prone in future.

The topology information 443 indicates logical relations between accelerator resources, accelerator cards, accelerator devices, instances and sessions, and the topology information can provide the knowledge about range of influence of a given error. For instance, a fatal error in the accelerator device will impact all software instances on the accelerator device, or an error of the accelerator card breaks every accelerator device disposed within the accelerator card.

Figure 5:
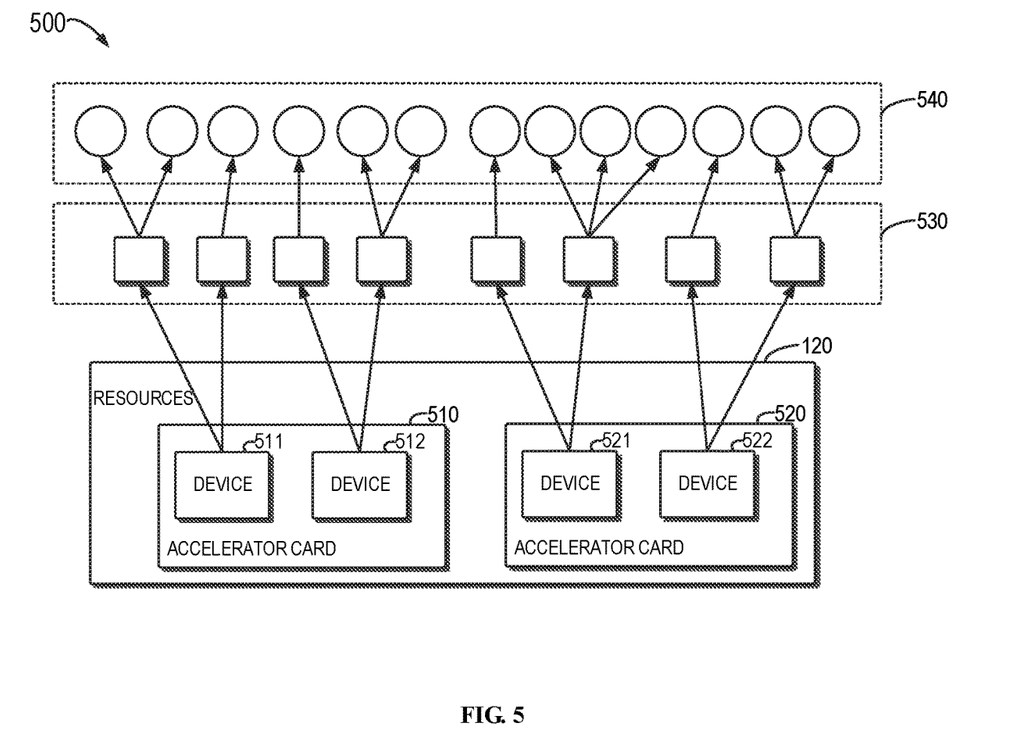
FIG. 5 illustrates a schematic diagram of a topological structure in the accelerator resources according to the present disclosure.

FIG. 5 illustrates a schematic diagram of a topological structure 500 in the accelerator resources according to embodiments of the present disclosure. As shown in FIG. 5, the accelerator resources 120 include a plurality of accelerator cards 510 and 520, and each accelerator card may be a QAT card and may include one or more accelerator devices. Although these accelerator devices are physically distributed on the same accelerator card, they are independent of each other on the logical level. For example, the accelerator card 510 includes accelerator devices 511 and 512 while the accelerator card 520 includes accelerator devices 521 and 522. Although each accelerator card only includes two accelerator devices as shown in FIG. 5, the accelerator card also may include more accelerator devices. Each accelerator device may provide one or more software instances as indicated by instance level 530, and each software instance may support one or more sessions as represented by session level 540. The hierarchical relations among the accelerator resources, the accelerator cards, the accelerator devices, the instances and the sessions constitute the topology information of the accelerator resources.

Returning to FIG. 4, the error detection module 410, the error recovery module 420 and the failover module 430 can improve the system performance using information in the multi-dimensional information database 440.

Error Detection

Traditional solutions rely on the heartbeat detection to find fatal errors (in the case of an unresponsive accelerator device). However, a full workload will affect the response of the heartbeat detection. For this, embodiments of the present disclosure propose a workload-aware heartbeat detection method. As shown in FIG. 4, the error detection module 410 includes a heartbeat API 411, a recoverable error API 412 and a workload-aware detection parameter adjustor 413 according to embodiments of the present disclosure.

According to embodiments of the present disclosure, the error detection module 410 is used for detecting an error of the accelerator device. By accessing the utilization rate information 411, the workload-aware detection parameter adjustor 413 can adjust one or more detection parameters (such as timeout value and/or frequency) when calling the heartbeat API. In some embodiments, the most suitable detection parameters corresponding to different workloads may be obtained through experimentation or machine learning. Once a mapping table is established between the detection parameters and the workloads, the workload-aware detection parameter adjustor 413 can adjust the detection parameter with the mapping table according to the runtime workload, and the detection parameter may include the timeout value and the detection frequency, and also may include other parameters for error detection. Besides, when an error of the accelerator device is detected, the error detection module 410 may record the error information into the historical error information 442 to maintain the historical error information database in real time.

Error Recovery

Generally, from the view of cost and efficiency, the error recovery method has different levels of resetting. As an ascending sequence, the level of resetting may include a session reset, an instance reset, an accelerator device reset and an accelerator card reset. However, in most situations, the traditional method has no idea about the level to be reset. As a result, resetting is performed level by level, which brings extra burdens and even adversely influences the entire system. Therefore, the traditional reset approach is less efficient and unintelligent. For example, according to the traditional method, the application first tries to reset the sessions (least costly), then the instances, the accelerator devices and even the entire accelerator card (most costly).

According to embodiments of the present disclosure, the error recovery module 420 may include a decision system 421 and an object resetting module 422, and the decision system 421 can make decisions more intelligently by taking into account the topology information 443 and the historical error information 442. For example, when two instances on the same accelerator device have errors, the best option is to directly reset the accelerator device. Another example is when the resetting has been performed many times on the same accelerator device within a short period of time and the problem still exists, the option may be to abandon recovery for the device and performing an offline diagnosis. Therefore, the error recovery method according to embodiments of the present disclosure can more accurately discover the object to be recovered and further select a most suitable level for resetting.

The decision system 421 is provided for implementing advance decision-making logic. When an error occurs in the accelerator device, the decision system 421 determines the object to be reset, such as level of resetting, by considering the topology information 443 and the historical error information 442. For example, a fatal error on a certain accelerator device is determined to occur repeatedly during a short period of time by means of the historical error information 442, rendering a radically unrecoverable breakdown. In such case, it is deemed that the accelerator device can no longer be recovered. With the aid of the topology information 443, multiple common instance errors on a certain accelerator device may be determined. Therefore, the accelerator device may be directly reset without resetting the instance in advance. In this way, the unnecessary resetting is skipped and the error recovery efficiency of the system is improved, thereby boosting the performance of the system. After the level of resetting is determined, the object resetting module 422 may execute corresponding resetting, and the levels of resetting include a session level, an instance level, a device level and so on.

Failover

In general, in a case where an error occurs in a software instance on the accelerator device while other instances still operate normally, it is necessary to smoothly migrate the workload to other functioning instances. However, the traditional solution does not have such a failover solution for instances in the accelerator device.

According to embodiments of the present disclosure, the unfinished workload can be migrated to the most suitable instances or devices based on the multi-dimensional information database 440. As shown in FIG. 4, the failover module 430 includes a target instance selector 431 and a failover operator 432. The failover operation performs the actual workload migration by recommitting the unfinished tasks to the available target instance. The target instance selector 431 is used for selecting an appropriate instance as the migration target. The target instance selector 431 can select a most stable target instance by means of the historical error information 442, and the target instance selector 431 can select the idlest target instance with the aid of the runtime utilization information 441. In some embodiments, a target instance that is both stable and idle may be selected. Moreover, the target instance selector 431 also can make the decision by considering the topology information 443 so as to quickly find a peer instance. After the target instance is selected, the failover operator 432 is provided for performing the detailed migration work of the workload.

Figure 6:
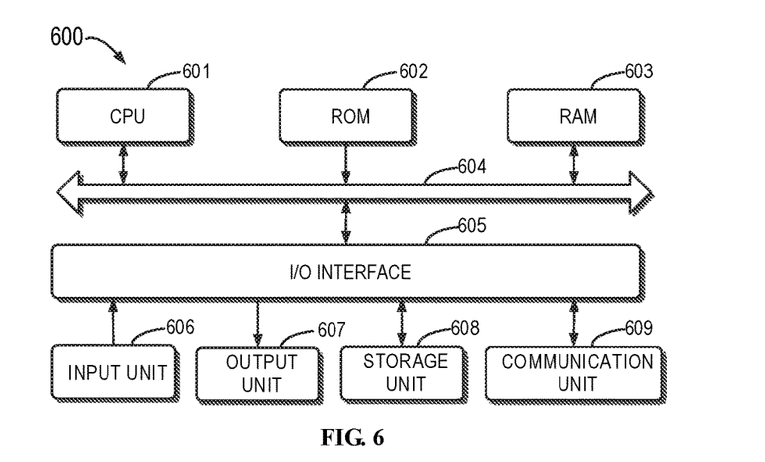
FIG. 6 illustrates a schematic block diagram of a device for implementing embodiments of the present disclosure.

FIG. 6 illustrates a schematic block diagram of a device 600 for implementing embodiments of the present disclosure. The device 600 may be a device or apparatus as described in embodiments of the present disclosure. As shown, the device 600 includes a central processing unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 also can store all kinds of programs and data required by the operations of the device 600. CPU 601, ROM 602 and RAM 603 are connected to each other via a bus 604. The input/output (I/O) interface 605 is also connected to the bus 604. Although not shown, the device also may include a coprocessor.

A plurality of components in the device 600 is connected to the I/O interface 605, including: an input unit 606, such as keyboard, mouse and the like; an output unit 607, such as various kinds of display and loudspeakers etc.; a storage unit 608, such as disk and optical disk etc.; and a communication unit 609, such as network card, modem, wireless transceiver and the like. The communication unit 609 allows the device 600 to exchange information/data with other devices via the computer network, such as Internet, and/or various telecommunication networks.

The above described method or procedure can be executed by the processing unit 601. For example, in some embodiments, the method can be implemented as a computer software program tangibly included in the machine-readable medium, e.g., storage unit 608. In some embodiments, the computer program can be partially or fully loaded and/or mounted to the device 600 via ROM 602 and/or communication unit 609. When the computer program is loaded to RAM 603 and executed by the CPU 601, one or more steps or acts of the above described method or procedure may be implemented.

In some embodiments, the above described method and procedure can be implemented as a computer program product. The computer program product can include a computer-readable storage medium, on which the computer-readable program instructions for performing various aspects of the present disclosure are loaded.

The computer-readable storage medium can be a tangible apparatus that maintains and stores instructions utilized by the instruction performing apparatuses. The computer-readable storage medium can be, but is not limited to, an electrical storage device, magnetic storage device, optical storage device, electromagnetic storage device, semiconductor storage device or any appropriate combinations of the above. More examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for performing operations of the present disclosure may be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages and traditional procedural programming languages, e.g., "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions may be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of a program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for performing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable those skilled in the art to understand respective embodiments of the present disclosure.

We claim:

1. A method for error management, comprising:
    obtaining a utilization rate of an accelerator device in accelerator resources, the accelerator resources comprising one or more accelerator devices;
    adjusting a detection parameter for detecting an error in the accelerator device based on the utilization rate of the accelerator device;
    performing an error detection for the accelerator device based on the detection parameter,
    in accordance with determining the error of the accelerator device, performing an error recovery based on topology information of the accelerator resources, the topology information at least comprising hierarchical relations among devices, instances and sessions in the accelerator device.

2. The method of claim 1, wherein adjusting the detection parameter for detecting the error in the accelerator device comprises:
    obtaining, based a pre-established mapping table, a timeout value and a detection frequency corresponding to the utilization rate, the pre-established mapping table being obtained by experimentation or machine learning.

3. The method of claim 2, wherein performing the error detection for the accelerator device comprises:
    initiating a detection request for the accelerator device periodically according to the detection frequency;
    determining a response time of the accelerator device to the detection request; and in accordance with a determination that the response time of the accelerator device is greater than the timeout value, detecting an error of the accelerator device.

4. The method of claim 1, wherein performing the error recovery based on topology information of the accelerator resources comprises:
   determining a level of resetting for the error recovery based on an analysis for an error of the accelerator device, the level of resetting at least comprising a session level, an instance level and a device level; and
   performing the resetting based on the level of resetting.

5. The method of claim 4, wherein performing the error recovery based on topology information of the accelerator resources further comprises:
   determining whether the accelerator device is recoverable based on historical error information recording historical errors of the accelerator device; and
   in accordance with a determination that the accelerator device is recoverable, performing the error recovery.

6. The method of claim 1, wherein the accelerator resources are one or more Quick Assist Technology (QAT) cards.

7. An electronic device, comprising:
   a processing unit; and
   a memory coupled to the processing unit and stored with instructions, the instructions, when executed by the processing unit, performing a method, the method comprising:
      obtaining a utilization rate of an accelerator device in accelerator resources, the accelerator resources comprising one or more accelerator devices;
      adjusting a detection parameter for detecting an error in the accelerator device based on the utilization rate of the accelerator device;
      performing an error detection for the accelerator device based on the detection parameter; and
      in accordance with determining the error of the accelerator device, performing an error recovery based on topology information of the accelerator resources, the topology information at least comprising hierarchical relations among devices, instances and sessions in the accelerator device.

8. The electronic device of claim 7, wherein adjusting the detection parameter for detecting the error in the accelerator device comprises:
   obtaining, based a pre-established mapping table, a timeout value and a detection frequency corresponding to the utilization rate, the pre-established mapping table being obtained by experimentation or machine learning.

9. The electronic device of claim 8, wherein performing the error detection for the accelerator device comprises:
   initiating a detection request for the accelerator device periodically according to the detection frequency;
   determining a response time of the accelerator device to the detection request; and
   in accordance with a determination that the response time of the accelerator device is greater than the timeout value, detecting an error of the accelerator device.

10. The electronic device of claim 7, wherein performing the error recovery based on topology information of the accelerator resources comprises:
    determining a level of resetting for the error recovery based on an analysis for an error of the accelerator device, the level of resetting at least comprising a session level, an instance level and a device level; and
    performing the resetting based on the level of resetting.

11. The electronic device of claim 10, wherein performing the error recovery based on topology information of the accelerator resources further comprises:
    determining whether the accelerator device is recoverable based on historical error information recording historical errors of the accelerator device; and
    in accordance with a determination that the accelerator device is recoverable, performing the error recovery.

12. A computer program product tangibly stored on a non-transitory computer readable medium and comprising computer-executable instructions, the computer-executable instructions, when executed, cause a computer to perform a method, the method comprising:
    obtaining a utilization rate of an accelerator device in accelerator resources, the accelerator resources comprising one or more accelerator devices;
    adjusting a detection parameter for detecting an error in the accelerator device based on the utilization rate of the accelerator device;
    performing an error detection for the accelerator device based on the detection parameter; and
    in accordance with determining an error in a first instance of the accelerator device, selecting a second instance of the accelerator device for failover based on a multi-dimensional information database storing topology information, historical error information and utilization rate information.

13. The computer program of claim 12, wherein selecting the second instance of the accelerator device for failover based on the multi-dimensional information database comprises:
    determining that the second instance of the accelerator device is stable based on the historical error information; and
    migrating a workload in the first instance to the second instance of the accelerator device.

14. The computer program of claim 13, wherein determining the second instance of the accelerator device comprises:
    determining a plurality of stable instances of the accelerator device based on the historical error information, the plurality of stable instances comprising the second instance of the accelerator device; and
    selecting the second instance of the accelerator device from the plurality of stable instances of the accelerator device based on the utilization rate information.

* * * * *